United States Patent [19]

MacInnes

[11] Patent Number: 4,530,640

[45] Date of Patent: Jul. 23, 1985

[54] METHOD AND APPARATUS FOR WASTEGATING TURBOCHARGED ENGINE WITH DIVIDED EXHAUST SYSTEM

[75] Inventor: Hugh MacInnes, La Canada, Calif.

[73] Assignee: Roto-Master, Inc., N. Hollywood, Calif.

[21] Appl. No.: 426,815

[22] Filed: Sep. 29, 1982

[51] Int. Cl.³ .................. F02B 39/00; F02D 23/00
[52] U.S. Cl. ................... 415/144; 415/28; 415/205; 60/602
[58] Field of Search .............. 415/28, 144, 145, 204, 415/205; 60/600, 602

[56] References Cited

U.S. PATENT DOCUMENTS

| 3,104,520 | 9/1963 | Cazier et al. ............ 415/145 X |
| 4,027,994 | 6/1977 | MacInnes ............... 415/205 X |
| 4,120,156 | 10/1978 | McInerney ............. 415/144 X |

FOREIGN PATENT DOCUMENTS

| 2948089 | 6/1981 | Fed. Rep. of Germany ........ 60/602 |
| 2948061 | 7/1981 | Fed. Rep. of Germany ...... 415/145 |
| 920642 | 4/1947 | France ................. 415/204 |
| 2059515 | 4/1981 | United Kingdom ........... 415/145 |

Primary Examiner—Robert E. Garrett
Assistant Examiner—Joseph M. Pitko
Attorney, Agent, or Firm—Cislo, O'Reilly & Thomas

[57] ABSTRACT

A turbocharged engine is provided with a turbine housing which has an inlet, an outlet located radially interiorally from the inlet, a centrally located turbine wheel cavity, and an internal scroll passageway which diminishes in cross section as it leads from the inlet around the turbine wheel cavity. The scroll passageway means is bifurcated from the inlet through an arc of between 180° and 300° to divide the incoming exhaust gas from different sets of cylinders of an internal combustion engine into identical, but separate, flow paths to minimize feedback of pulsations of exhaust gases from one set of cylinders to the other. The separate flow paths within the turbine housing are combined into a single flow pathway near the end of the scroll passageway, and a single wastegate valve is in communication with the single flow pathway. A portion of the exhaust gases is selectively diverted from the single flow pathway to the single wastegate valve to maintain maximum speed of operation of the turbine wheel.

6 Claims, 3 Drawing Figures

U.S. Patent   Jul. 23, 1985   4,530,640
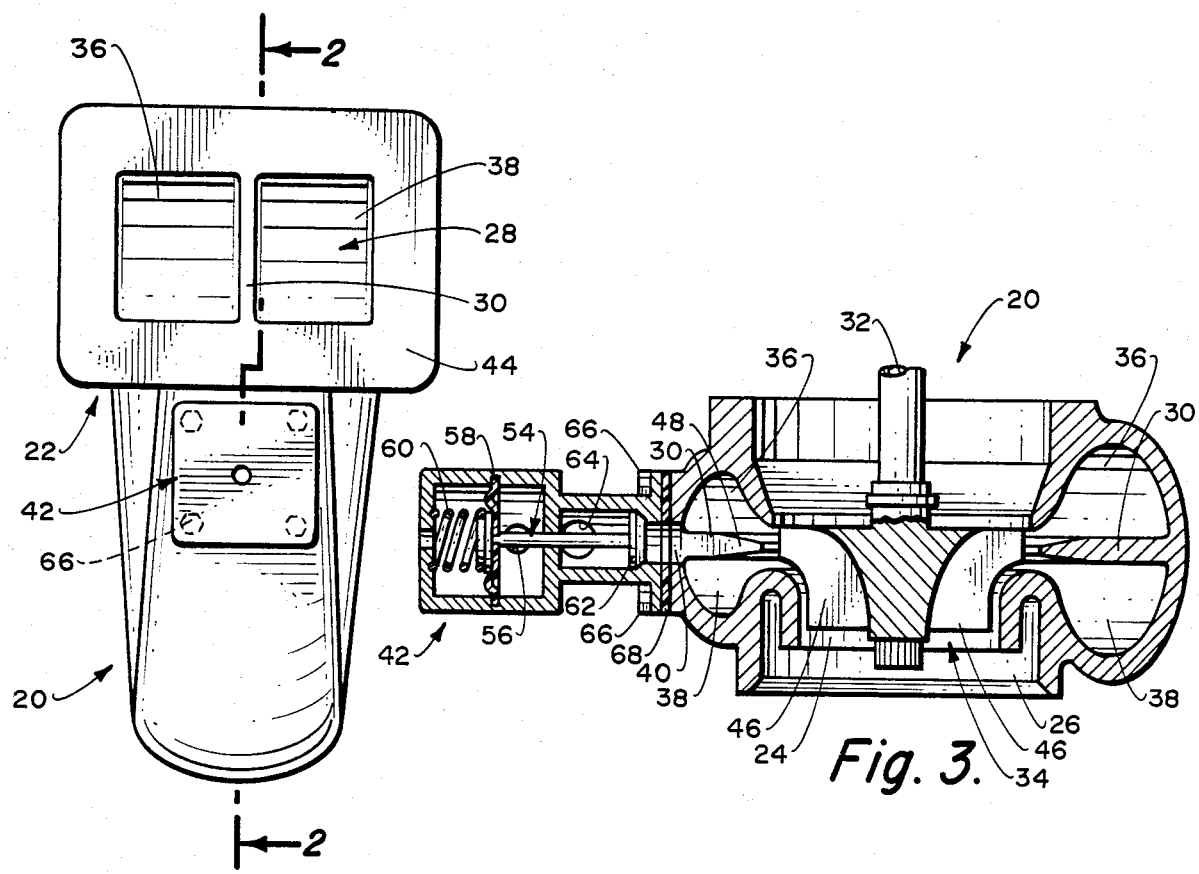
Fig. 1.
Fig. 3.
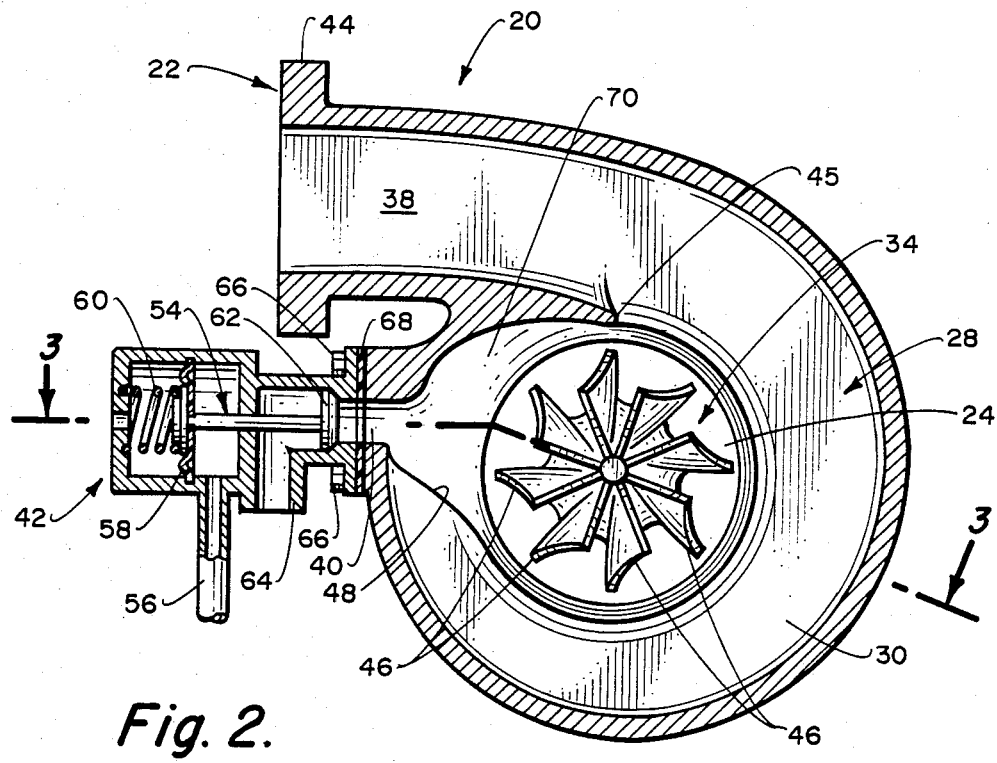
Fig. 2.

METHOD AND APPARATUS FOR WASTEGATING TURBOCHARGED ENGINE WITH DIVIDED EXHAUST SYSTEM

BACKGROUND OF THE INVENTION

This invention relates to methods of operating turbochargers and to a unique turbine housing design for a turbocharger.

Turbochargers are well known in the prior art and conventionally utilize a turbine wheel and a compressor impeller mounted on a unitary or common shaft, carried within respective housings therefor. The turbine housing includes a gas inlet and a gas outlet wherein there is provided, in the typical case, an internal scroll configuration as is well known to the art.

In the typical case the turbine housing defines an inlet, an outlet located radially interiorly from the inlet, a centrally located turbine wheel cavity, and a volute passageway encircling the turbine wheel cavity and extending with a diminishing cross sectional area to encircle the turbine wheel cavity. Exhaust gases from an engine are directed to the turbine housing through the volute or scroll passageway therein. Since the passageway diminishes in cross sectional area, the velocity of the exhaust gases through the turbine housing is maintained at a high level throughout the circumferance of the turbine housing. Thus, throughout the circumferance of the turbine the exhaust gases impinge at a high, relatively uniform velocity on the turbine blades to rotate the turbine wheel, which in turn causes rotation of the compressor impeller.

The compressor impeller compresses ambient air and/or air-fuel mixture to supply the same in a compressed state to the intake manifold of the internal combustion engine. The internal combustion engine typically includes a plurality of cylinders, the gas outlets from which are coupled together in banks or manifolds. The exhaust gas manifolds from the sets of cylinders are coupled to the inlet of the turbine housing.

The exhaust gas outlets from the cylinders of the internal combustion engines used in turbochargers are conventionally connected in two banks or sets of an identical number of cylinders. Initially the exhaust manifolds from both sets of cylinders were combined and directed in a single flow pathway through a radial inflow turbine housing of the type described.

One problem which initially existed in turbochargers was that overcompression of the air or air-fuel supply mixture being fed to the internal combustion engine sometimes occured. Accordingly, it became necessary to reduce the exhaust gas flow through the turbine housing so that a portion of the exhaust gases bypassed the turbine wheel. The diversion of a portion of the exhaust gases was achieved by providing the exhaust manifolds of each set of cylinders of the internal combustion engine with a wastegate valve. A selected portion of the exhaust gases from each of the sets of cylinders was thereby diverted prior to reaching the inlet of the turbine housing. Using such an arrangement, selective control of exhaust gas flow became possible so as to allow control of compression and prevent overcompression of air and fuel at the inlet to the internal combustion engine. However, such arrangements required duplicate valving systems. Also, it was necessary to locate the wastegate valves in proximity to the turbine housing, or form the wastegate valves as an integral part of the turbine housing. Due to limited space in that particular area of the turbocharger, placement, installation and maintenance of the wastegate valves became a problem.

Another problem which existed in the turbocharger art was that the exhaust from the several cylinders of the internal combustion engine in the turbocharger did not create a uniform pressure in the exhaust manifolds, but instead resulted in the release of hot, high pressure exhaust gases in sharply defined surges or pulsations. Such surges and pulsations occur because immediately following the power stroke of a piston in a cylinder of an internal combustion engine, the gas in the cylinder is still under a high pressure. As the exhaust valve initially opens, the major portion of the hot exhaust gases quickly flows or surges at high velocity into the exhaust manifold. Following the initial surge, and during the remaining period that the exhaust valve is open, the flow of exhaust gases from the cylinder is at a relatively low velocity compared to the initial surge. The expulsion of exhaust gases following the initial surge occurs due to normal piston movement which decreases the volume of the cylinder, rather than as a result of a pressure differential between the cylinder and exhaust manifold such as exists immediately prior to opening of the exhaust valve of the cylinder.

Pulsations and surges in the exhaust manifolds of the banks or sets of cylinders did not occur in unison. Rather, the surges of exhaust gases within each exhaust manifold tended to be interspersed with surges in the other manifold. At the junction of the two manifolds at the inlet to the turbine housing, the surges and pulsations in each manifold tended to create a back pressure in the other manifold. This reduced both the efficiency of operation of the internal combustion engine, and also reduced efficiency of operation of the turbine wheel, since instead of providing pressure only to the turbine wheel, the energy of the exhaust gases created a manifold back pressure which adversely affected the exhaust gas flow from the other set of cylinders.

Various attempts were made to eliminate this problem. In particular, the construction of the turbine housing was altered to include a divider at the inlet to the turbine housing chamber of the turbocharger. The exhaust manifolds of the two sets of cylinders did not meet in a junction at the inlet to the turbine housing, but rather were directed through separate flowpaths within the turbine housing. It was discovered that in a radial inflow turbine housing for use with turbochargers wherein the housing was of the type having a generally 360° volute housing chamber receiving gas flow through an inlet passage and discharging gas flow progressively radially inwardly circumferentially around the chamber into a generally central turbine wheel location, it was advantageous to extend a divider in the passageway to divide the flow passageway over an arc of between about 180° and 300°. The length of the divider was governed by the number of cylinders of the internal combustion engine with which the turbocharger is used as well as the speed range of the engine. In general, the lower the number of cylinders of the internal combustion engine, or the lower the speed range of the engine, the greater was the benefit of a divided turbine housing. Thus, for internal combustion engines having a relatively few number of cylinders or operated at relatively low speeds, the housing chamber was divided throughout an arc of up to a maximum of about 300°. Conversely, the greater the number of engine cylinders or the greater the engine speed range, the smaller was the effect of the housing chamber divider. It was advantageous with such engines to terminate the housing chamber divider closer to the 180° minimum limit. A turbocharger turbine housing design having such a divider is described in U.S. Pat. No. 4,027,994, issued June 7, 1977.

Another advance in the art of the turbochargers which was developed was the relocation of the exhaust gas wastegate from the inlet of the turbine housing to a bypass exist port intermediate the inlet to the turbine housing and the terminus of a single volute passageway defined in the turbine housing to carry the exhaust gas from a conventional junction of a dual manifold exhaust system to the centrally located turbine wheel positioned within the turbine housing. The primary reason for relocating the position of the wastegate apparatus was to remove it from the area of the inlet of the turbine housing so as to permit ease of placement of the turbine housing within an engine compartment and to improve the efficiency of operation of the turbine wheel. Such an arrangement is described in U.S. patent application Ser. No. 376,492, filed May 10, 1982.

Until the present invention the prior art failed to recognize the advantages which could be achieved by constructing a turbine housing for a turbocharger both with an interior divider of scroll configuration bifurcating the passageway into axially adjacent passages over an arc of between about 180° and 300°, and providing the same turbine housing with an exhaust port in communication with the passageway between the terminus of the divider and the outlet to the turbine wheel. Such an arrangement simplifies the wastegating of a divided exhaust system while maintaining a good turbine efficiency. Such a wastegating system also eliminates the requirement for a double valve or two separate valves for use with an internal combustion engine in a turbocharger having a divided exhaust system.

OBJECTS AND SUMMARY OF THE INVENTION

It is an object of the invention to provide a unique manner of operating a turbocharger having a unique turbine housing.

It is another important object of the invention to provide a turbocharger turbine housing with both a divided exhaust gas flow passageway from the turbine housing inlet over an arcuate path terminating short of the end of the internal scroll passageway and also with an exit port especially adapted to receive a wastegate valve assembly in communication with the interior turbine housing passageway beyond the terminus of a divider in the passageway.

It is another even further more specific object of the invention to provide a turbocharger turbine housing having an internal scroll divided into two axially adjacent volute passageways of diminishing cross sectional area leading from the inlet of the turbine housing with a bypass exit port beyond the terminus of the divider.

It is another even further important and more specific object of the invention to provide a method of operating a turbocharger in a wastegated mode, using a radial inflow turbine with a bifurcated volute flow passageway of cross sectional area that diminishes from the inlet, at a substantially greater efficiency than has heretofore been possible.

It is another even further more specific and important object of the invention to eliminate the requirement for either a double valve or two separate valves in a wastegating system for a turbocharger engine having a divided exhaust system.

It is another important and even further more specific important object of the invention to eliminate the need for close synchronization of operation of dual or separate wastegating valves in a turbocharger engine having a divided exhaust system.

It is another even further more specific object of the invention to provide a radial inflow turbine housing having a volute flow passageway of diminishing cross section from the turbine housing inlet with a simple, unitary wastegate valve arrangement which communicates with the turbine housing downstream from the termination of a divider bifurcating the flow passageway in the turbine housing.

It is a further important and even more specific object of the invention to provide a turbine housing with an exit port for communication with a single wastegate valve which can be integrally formed into the structure of the turbine housing, or adapted for coupling with a removable wastegate valve assembly.

Generally, in an exemplary embodiment, the invention is directed to the method of directing the flow of exhaust gas in a turbocharger from the exhaust of an internal combustion engine having a plurality of cylinders through a radial inflow turbine housing in a volute path toward a turbine wheel and wastegating a portion of the exhaust gas to bypass the turbine wheel. The improvement of the invention resides in channeling the flow of the exhaust gas from different cylinders of the internal combustion engine along different pathways of diminishing cross section in the turbine housing through a volute arc of between about 180° and 300°, thereupon combining the flow of the exhaust gas into a single flow pathway leading to the turbine wheel, and selectively diverting a portion of the combined flow of exhaust gas from the single flow pathway in the turbine housing to a single wastegate valve.

The structure of the invention relates to an improved radial inflow turbine housing for turbochargers and the like. The turbine housing defines an inlet, an outlet located radially interiorly from the inlet, a centrally located turbine wheel cavity, and volute passageway means encircling the turbine wheel cavity and extending in from the inlet and diminishing in cross sectional area therefrom.

The structural improvement of the invention resides in the combination of an interior divider of scroll configuration extending from the inlet to bifurcate the passageway means into axially adjacent passageways over an arc of between about 180° and 300°, and also an exit port communicating with the passageway means beyond the terminus of the divider.

The objects, method, and structure of the invention will further become apparent from the hereinafter following commentary taken in conjunction with the figures of the drawing.

BRIEF DESCRIPTION OF THE DRAWING

FIG. 1 is an end elevational view of a turbine housing component of a turbocharger having a divided internal scroll configuration and illustrating the inlet thereof;

FIG. 2 is a sectional elevational view of the turbine housing taken along the lines 2—2 of FIG. 1; and FIG. 3 is a sectional view of the turbine housing taken along the lines 3—3 of FIG. 2.

DESCRIPTION OF THE BEST EMBODIMENT CONTEMPLATED

Referring to the drawing, wherein like numerals of reference designate like elements throughout, it will be seen that the turbine housing 20 includes a housing chamber inlet port 22 radially displaced from a central, generally cylindrical turbine wheel cavity 24. An outlet port 26 is located radially interiorally from the inlet port 22 and in axial alignment and in communication with the turbine wheel cavity 24.

The turbine housing 20 defines an internal scroll passageway means indicated generally at 28. The passageway means 28 leads from the inlet port 22 in volute fashion and in diminishing cross section to surround the turbine wheel cavity 24. The passageway means 28 includes a transverse partition 30 which lies in a plane perpendicular to the axle 32 of the turbine wheel 34 that is located in the turbine wheel cavity 24. The partition 30 bifurcates the passageway means 28 into separate axially adjacent passageways 36 and 38, both illustrated in FIGS. 1 and 3. The bifurcating partition 30, and the separate passageways 36 and 38, extend from the inlet port 22 throughout an arc of between about 180° and 300°, as illustrated in FIG. 2. The turbine housing 20 also includes a waste gas port 40 which is connected to the passageway means 28 beyond the termination of the partition 30. The waste gas port 40 is configured with tapped bores to receive a single wastegate valve assembly 42, as depicted in FIGS. 2 and 3.

The inlet port 22 terminates in a flange 44 which is adapted to be connected to dual exhaust manifolds of an internal combustion engine having a plurality of cylinders (not shown).

As in conventional turbochargers, the internal combustion engine is divided into two equal sets of cylinders. The exhausts of one set of cylinders are connected to a manifold which may be bolted or otherwise secured to the flange 44 for communication with the volute passageway 36 defined in the turbine housing 20. The other set of cylinders is coupled to an exhaust manifold which may be bolted or otherwise secured to the flange 44 in communication with the volute passageway 38.

The turbine housing 20 is of a conventional radial inflow type of a volute or generally helical configuration, as depicted in FIG. 2. The passageway means 28 has a generally toroidal cross section which diminishes in cross sectional area from a largest cross sectional area at the inlet port 22 to a smallest cross sectional area adjacent the underside of the usual tongue terminus 45, visible in FIG. 2. The tongue terminus 45 acts as a nozzle to direct exhaust gases introduced into the inlet port 22 and having passed through the internal scroll passageway means 28 to impinge upon the blades 46 of the turbine wheel 34. As best illustrated in FIG. 3, it is apparent that the dividing partition 30 bisects the internal scroll passageway means 28 throughout the greater portion of its length into two axially adjacent, but separate passageways 36 and 38 which diminish from a maximum cross section at the inlet port 22 to a minimum cross section at the terminus 48 of the dividing partition 30.

The exit port 40 is adapted to receive the single wastegate valve assembly 42, although it is also adapted to interchangeably receive a closure plate in place thereof. The wastegate valve assembly 42 is a conventional structure which includes a spring biased poppet valve 54 which is controlled by pressure in the internal combustion intake manifold. A pressure tube 56 leads from the intake manifold (not shown) to the wastegate valve assembly 42. Excessive pressure in the intake manifold will depress the fluid tight diaphragm 58 in the wastegate valve assembly 42 to the left, as viewed in FIGS. 2 and 3, thereby overcoming the bias of the coil spring 60 and lifting the valve member 62 from its valve seat in the wastegate valve assembly 42. A portion of the exhaust gas from the internal scroll passageway means 28 may thereby be selectively diverted through a wastegate duct 64 to bypass the turbine wheel 34.

The wastegate valve assembly 42 has a flange through which hexhead bolts 66 pass. The bolts 66 secure the wastegate valve assembly 42 to the exit port 40 of the turbine housing 20. A gasket 68 produces a fluid tight seal between the exit port 40 and the wastegate valve assembly 42.

During operation of the turbocharger in which the turbine housing 20 is employed, exhaust gas from the two exhaust manifolds of an internal combustion engine having a plurality of cylinders is directed to the inlet port 22. The exhaust from one manifold is directed through the volute passageway 36, while the exhaust from the other manifold is directed through the volute passageway 38. The gas thereby flows in identical but axially separated volute paths toward the turbine wheel 34 through the passageways 36 and 38 which are separated from each other by the dividing partition 30. The flow of exhaust gas from different of the cylinders of the internal combustion engine is thereby channeled along the different pathways defined by the passages 36 and 38. As is apparent from FIGS. 2 and 3, the pathways defined by the passageways 36 and 38 are of diminishing cross section proceeding from the inlet port 22. The passageways 36 and 38 both extend through a volute arc of between 180° and 300°, as described in U.S. Pat. No. 4,027,994.

At the terminus 48 of the dividing partition 30 the exhaust gas flow is, for the first time, combined into a single flow pathway, indicated at 70 in FIG. 2. The pressure in the intake manifold for the internal combustion engine of the turbocharger with which the turbine housing 20 is used selectively diverts a portion of the combined flow of exhaust gas from the single flow pathway 70 in the turbine housing 20 to the single wastegate valve 42. Proper selection of the spring 60 will allow the portion of the combined flow of exhaust gas which is diverted from the single flow passageway 70 to bypass the turbine wheel 34 to be varied to maintain a maximum efficiency of operation of the turbine wheel 34.

Peak efficiency of operation of the turbine wheel 34 is obtained in the case where $C_v/U$ is approximately 1.35, where $C_v$ is tangential gas velocity; and U is turbine wheel tip speed. Efficiency drops off very quickly where the ratio of $C_v/U$ is below 1.2 and gradually where that ratio exceeds 1.6.

In the method of operation of the turbine of the invention all of the gas passes through the internal scroll passageway 28 at all times, thereby imparting a higher tangential gas velocity to the system than can be achieved using wastegating operation in prior art systems where wastegating is accomplished prior to exhaust gas entering into the inlet of the internal scroll passageway 28. Moreover, because the internal scroll passageway 28 is bifurcated into separate, axially adjacent passageways 36 and 38 of diminishing cross sectional area from the inlet port 22, pulsation within the exhaust manifolds coupled to these separate passageways does not adversely affect exhaust gas flow in the other of the passageways. Moreover, by channeling flow through the separate passageways and selectively diverting a portion of the combined flow therefrom beyond the terminus 48 of the dividing partition 30, markedly superior results and improved efficiencies are achieved in the turbochargers with which the invention is used.

Thus, there has been disclosed and described, in illustrative fashion, a unique method of operation of a turbine comprising part of a turbocharger for internal combustion engines and a turbine housing of unique configuration for use therewith.

Those of ordinary skill in the art will at once recognize various changes and modifications from those which have been disclosed, but all such changes and modifications will not depart from the essence of the invention as disclosed herein and all such changes and modifications are intended to be covered by the appended claims.

We claim:

1. In a radial in-flow turbine housing for turbochargers and the like, defining an inlet, an outlet located radially interiorally from said inlet, a centrally located turbine wheel cavity, and volute passageway means encircling said turbine wheel cavity and extending in and diminishing in cross-sectional area from said inlet to terminate at said cavity, the improvement comprising in combination an interior divider of scroll configuration having a first terminus at said inlet extending from said inlet to a second terminus at said cavity to bifurcate said passageway means into axially adjacent passages over an arc of between 180° and 300° and a single exit port communicating with said passageway means beyond the said second terminus of said divider, said second terminus being located radially between said outlet and said single exit port, said interior divider being uninterrupted intermediate said first terminus and said second terminus, for maintaining gas isolation in said passageway means prior to combining said gas after passing beyond said second terminus for communication with said single exit port.

2. A turbine housing according to claim 1 wherein said exit port is adapted to receive a single wastegate valve assembly.

3. A turbine housing according to claim 2 wherein said exit port is also adapted to interchangeably receive a closure means.

4. A radial inflow turbine housing for turbo-chargers and the like surrounding a central turbine wheel cavity and defining an inlet port radially displaced from said turbine wheel cavity, an outlet located radially interiorally from said inlet in communication with said turbine wheel cavity, passageway means leading from said inlet in volute fashion and in diminishing cross-section to surround said turbine wheel cavity and including a partition having a first terminus at said inlet and a second terminus at said cavity bifurcating said passageway means into separate axially adjacent passageways and extending from said inlet throughout an arc of between about 180 degrees and 300 degrees, and a single waste gas port connected to said passageway means beyond the termination said second terminus of said partition, said second terminus being located radially between said outlet and said single waste gas port, said partition being uninterrupted intermediate said first terminus and said second terminus for maintaining gas isolation in said passageway means prior to combining said gas after passing beyond said second terminus for communication with said single exit port.

5. In a method of directing the flow of exhaust gas in a turbocharger from the exhaust of an internal combustion engine having a plurality of cylinders through a radial inflow turbine housing in a volute path toward a turbine wheel and wastegating a portion of said exhaust gas to bypass said turbine wheel, the improvement comprising channeling the flow of said exhaust gas from different of said cylinders of said internal combustion engine along different pathways of diminishing cross section in said turbine housing through a volute arc of between about 180° and 300°, thereupon combining the flow of said exhaust gas into a single flow pathway therebeyond, and selectively diverting a portion of said combined flow of exhaust gas from said single flow pathway in said turbine housing to a single wastegate valve, said different pathways being noncommunicating intermediate their length, said flow being combined locationally radially between said outlet and said single wastegate valve, whereby the majority of said exhaust gas travels through said different pathways before being selectively diverted.

6. In the method of claim 5, the further improvement comprising varying the portion of said combined flow of exhaust gas which is diverted to maintain a maximum efficiency of operation of said turbine wheel.

* * * * *